No. 829,840. PATENTED AUG. 28, 1906.
G. C. BRUNER.
GASKET.
APPLICATION FILED DEC. 26, 1905.
Fig. 1.
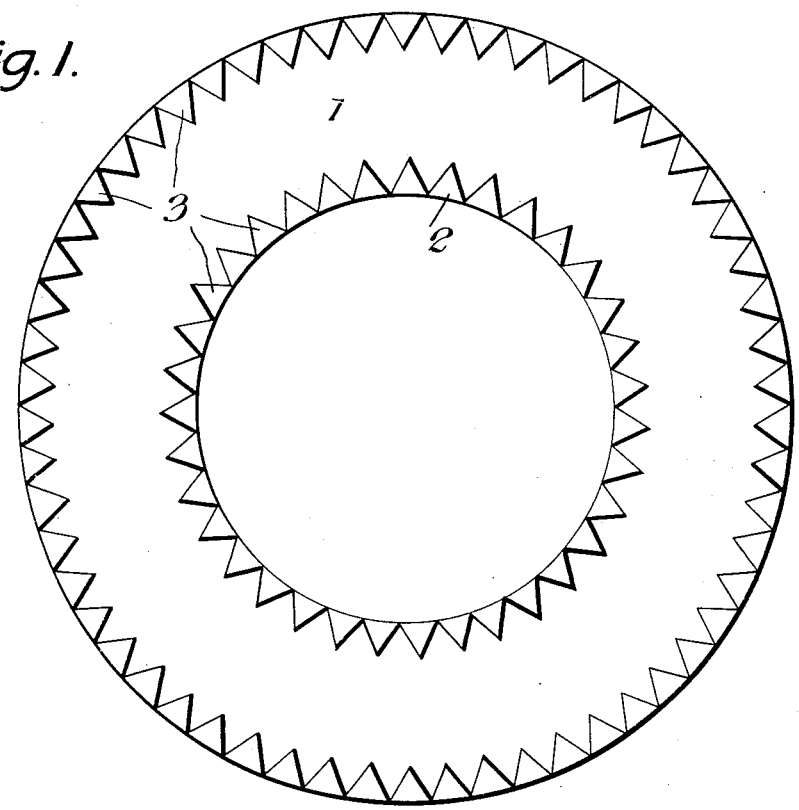
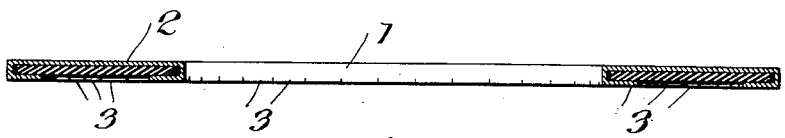
Fig. 2.
Witnesses
Geo. Hilton
C. H. Griesbauer
Inventor
G. C. Bruner,
by H. B. Willson
Attorney

UNITED STATES PATENT OFFICE.

GEORGE C. BRUNER, OF EVANSVILLE, INDIANA, ASSIGNOR OF ONE-HALF TO CHARLES NUSSMEIER, OF EVANSVILLE, INDIANA.

GASKET.

No. 829,840.  Specification of Letters Patent.  Patented Aug. 28, 1906.

Application filed December 26, 1905. Serial No. 293,336.

*To all whom it may concern:*

Be it known that I, GEORGE C. BRUNER, a citizen of the United States, residing at Evansville, in the county of Vanderburg and State of Indiana, have invented certain new and useful Improvements in Gaskets; and I do declare the following to be a full, clear, and exact description of the invention, such as will enable others skilled in the art to which it appertains to make and use the same.

This invention relates to improvements in gaskets.

The object of the invention is to provide a gasket or packing-ring having a metallic backing and means formed on said backing to secure the same onto said packing-ring or gasket.

With the above and other objects in view the invention consists of certain novel features of construction, combination, and arrangement of parts, as will be hereinafter described and claimed.

In the accompanying drawings, Figure 1 is a plan view of a gasket constructed in accordance with the invention. Fig. 2 is a sectional view of the same.

Referring more particularly to the drawings, 1 denotes the gasket, which may be formed of any suitable elastic material and in any desired form, the same being here shown in the form of a ring. Arranged on one side of the gasket 1 is a metallic backing-ring 2, preferably formed of copper or other ductile metal. Around the inner and outer edges of the metallic backing 2 is formed a series of teeth 3, which are here shown and are preferably, though not necessarily, V-shaped in form. The teeth 3 on the inner and outer edges of the backing-ring are adapted to be bent over the inner and outer edges of and onto the outer face of the gasket 1, the teeth 3 being pressed into tight engagement with the outer surface of the gasket, thereby securing the latter and said backing-ring together.

By providing a gasket constructed as herein shown and described the use and life of the same are greatly prolonged, and the metallic backing does not detract from the usefulness and operation of the gasket.

From the foregoing description, taken in connection with the accompanying drawings, the construction and operation of the invention will be readily understood without requiring a more extended explanation.

Various changes in the form, proportion, and the minor details of construction may be resorted to without departing from the principle or sacrificing any of the advantages of this invention.

Having thus described my invention, what I claim as new, and desire to secure by Letters Patent, is—

The herein-described gasket comprising an elastic body portion and a metal backing-ring, said ring having teeth on its inner and outer edges, said teeth being bent over onto the elastic gasket at its outer and inner edges to hold the body portion of the ring together, said gasket having one of its surfaces covered by the metal ring and its opposite surface being partially exposed, substantially as described.

In testimony whereof I have hereunto set my hand in presence of two subscribing witnesses.

GEORGE C. BRUNER.

Witnesses:
 JOSEPH M. HARTLEIN,
 LOUIS WEINHEIMER.